United States Patent
Tsu

(10) Patent No.: US 6,814,361 B2
(45) Date of Patent: Nov. 9, 2004

(54) GOLF BAG

(75) Inventor: Hsueh-Yi Tsu, Hsin Chuang (TW)

(73) Assignee: Hersun Plastic Co., Ltd., Taipei Hsien (TW)

( * ) Notice: Subject to any disclaimer, the term of this patent is extended or adjusted under 35 U.S.C. 154(b) by 0 days.

(21) Appl. No.: 10/337,329

(22) Filed: Jan. 7, 2003

(65) Prior Publication Data

US 2004/0130111 A1 Jul. 8, 2004

(51) Int. Cl.$^7$ ................................................. B62B 1/12
(52) U.S. Cl. ................ 280/43.1; 280/43.17; 280/47.26; 190/18 A
(58) Field of Search ..................... 280/43, 43.1, 43.17, 280/47.18, 47.26, 79.2, 38, 40, 651, 652, DIG. 6; 190/18 A

(56) References Cited

U.S. PATENT DOCUMENTS

| | | | | |
|---|---|---|---|---|
| 2,472,491 A | * | 6/1949 | Quinton | 280/37 |
| 4,007,512 A | * | 2/1977 | Oland | 16/19 |
| 4,254,850 A | * | 3/1981 | Knowles | 190/18 A |
| 4,273,222 A | * | 6/1981 | Cassimally et al. | 190/18 A |
| 4,397,062 A | * | 8/1983 | Huang | 16/33 |
| 4,575,109 A | * | 3/1986 | Cowdery | 280/37 |
| 4,773,123 A | * | 9/1988 | Yu | 16/34 |
| 4,846,493 A | * | 7/1989 | Mason | 280/641 |
| 5,478,097 A | * | 12/1995 | Forma | 280/47.26 |
| 5,533,231 A | * | 7/1996 | Bai | 16/34 |
| 5,599,037 A | * | 2/1997 | Spickler | 280/652 |
| 6,289,554 B1 | * | 9/2001 | Wang | 16/34 |
| 6,299,183 B1 | * | 10/2001 | Kaneko | 280/47.26 |
| 6,360,400 B1 | * | 3/2002 | Chang | 16/113.1 |
| 6,367,602 B1 | * | 4/2002 | Chang | 190/18 A |
| 6,598,889 B1 | * | 7/2003 | Su | 280/47.26 |

* cited by examiner

Primary Examiner—Christopher P. Ellis
Assistant Examiner—Jeffrey Restifo
(74) Attorney, Agent, or Firm—Rosenberg, Klein & Lee

(57) ABSTRACT

A golf bag includes a body, a seat, a glide device and a brake-device. The body is affixed to the seat and the seat includes a slot, a plate-channel and a cavity. There is a plurality of ditches on two sides of the seat. Nearby the ditches, there is a shaft-channel extending to the cavity; and the glide device is on the ditches of the seat so that a shaft can be passed through the wheels and the shaft-channel of the seat. The brake-device has a jammed-plate, a back-plate and a start-plate for controlling the seat when being towed or stored. The jammed-plate has a jammed-notch and an arm is attached to the slot. There is a first elasticity-component positioned between the jammed-plate and the slot. The back-plate is placed on the plate-channel to connect the jammed-plate on the seat. The starting-plate has a joint-plate and a pull-plate, wherein the joint-plate linking the wheels into action is connected to the seat and a second elasticity-component within the seat. The pull-plate has a brake-rod extending from the arm, which is hooked by the jammed-plate.

12 Claims, 6 Drawing Sheets

னிGOLF BAG

BACKGROUND OF THE INVENTION

1. Field of the Invention

The present invention generally relates to a golf bag, and more particularly to the golf bag with wheels can be laid down on tow without burden of carrying on shoulder or back.

2. Description of the Prior Art

As the promotion of life quality and more popular outdoor of activities, golf sports have become one of the modern people's favorite activities. As more and more golf gears are required, most people carry golf gears by golf bag. Referring to FIG. 1, golf clubs put in the golf bag 90 and place on cart 91 for moving to whole golf course, even so the cart 91 is moved for golf course only, not for other place. The golf players must to be carried Golf clubs and other golfing accessories in golf bag 90 on shoulder to go to one field to the other different field or the way to golf course by. The golf gear for players is a heavy burden. Not only retarding physical action, but also consuming physical strength. Especially, heavy carries cause man's physical overloading and retarding sports excising after finishing playing golf.

According to conventional problem burden of carrying about picking up golf bag on shoulder, the present invention has a solution to facilitate easy transport of golf bags. It is a benefit for popular people, so the inventor hard to research and development to find solution.

SUMMARY OF THE INVENTION

It is an object of the present invention to provide an apparatus of golf bag having a device for towing to transport golf clubs and accessories of golf more easily.

It is a further object of the present invention to provide a golf bag for towing and picking on back or shoulder. The golf players carry the golf bag of present invention to easy transport during playing golf.

It is a further object of the present invention to provide hiding wheels for carrying the golf gears on back or shoulder.

The foregoing aspects and many of the attendant advantages of this invention will become more readily appreciated as the same becomes better understood by reference to the following detailed description, when taken in conjunction with the accompanying drawings.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENTS

Figure 1:
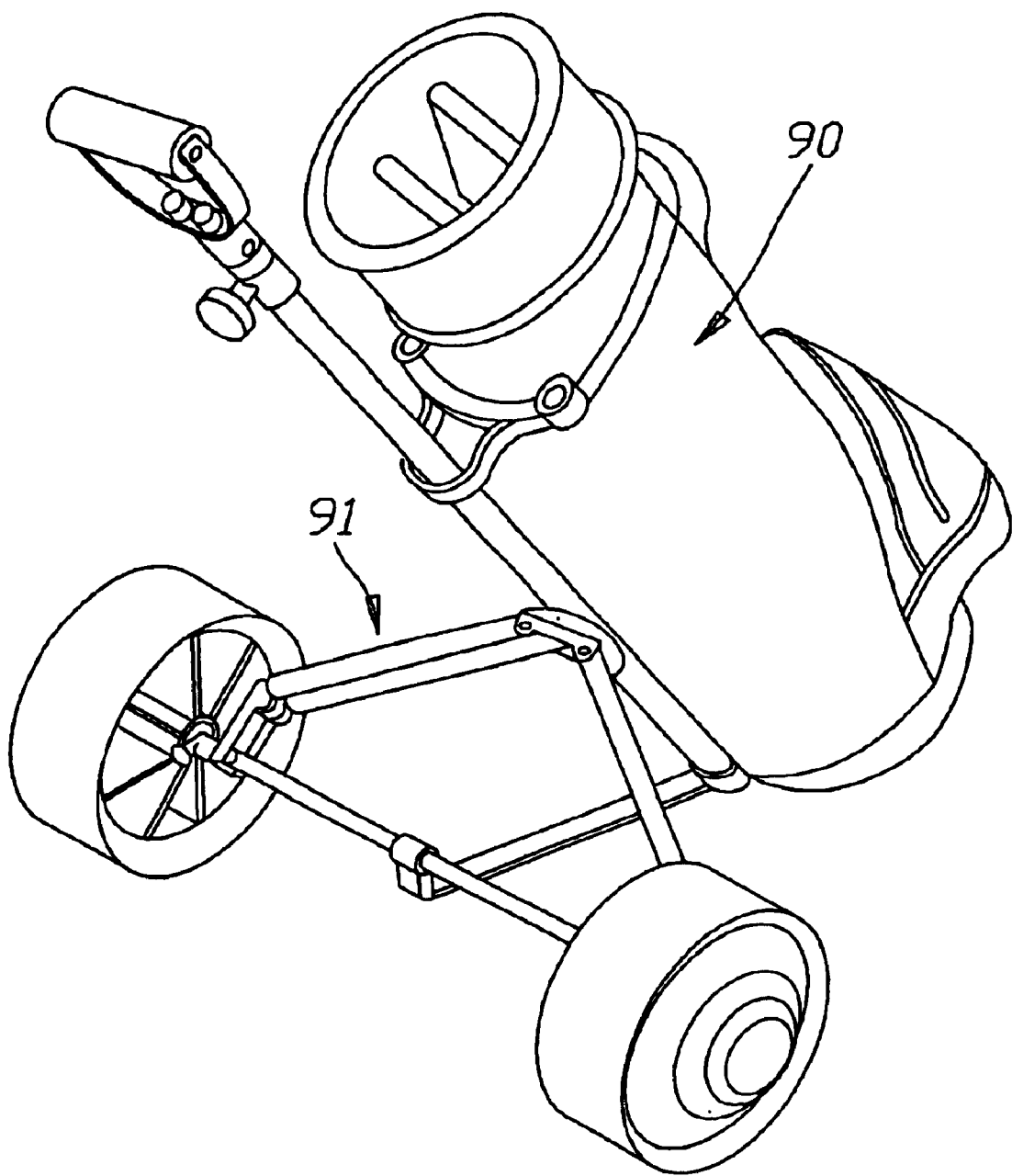
FIG. 1 is a schematic illustration of a golf bag putting on cart in accordance with traditional invention.
Figure 2:
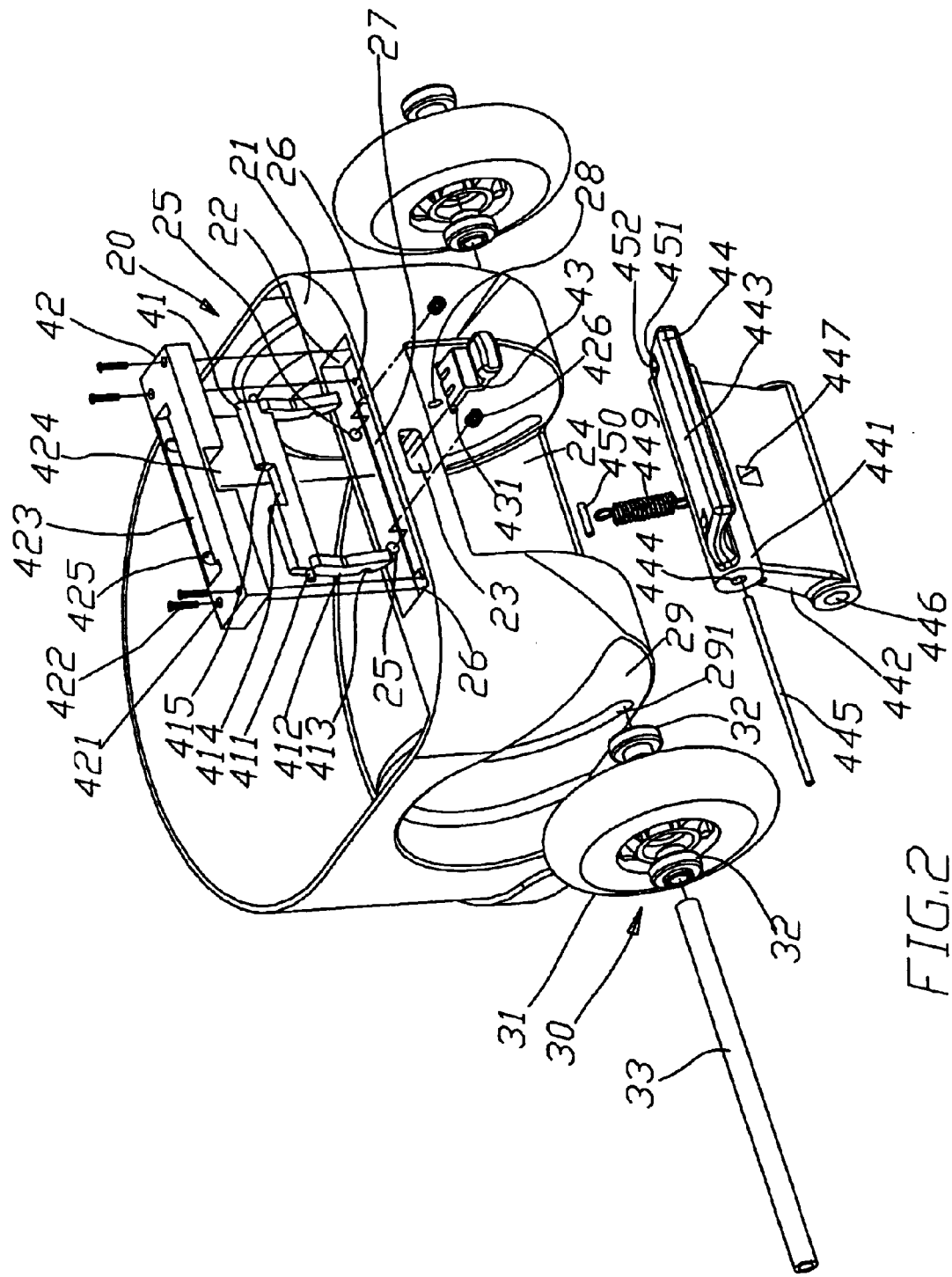
FIG. 2 is a schematic illustration fragmentary view of the embodiment of the present invention.
Figure 3:
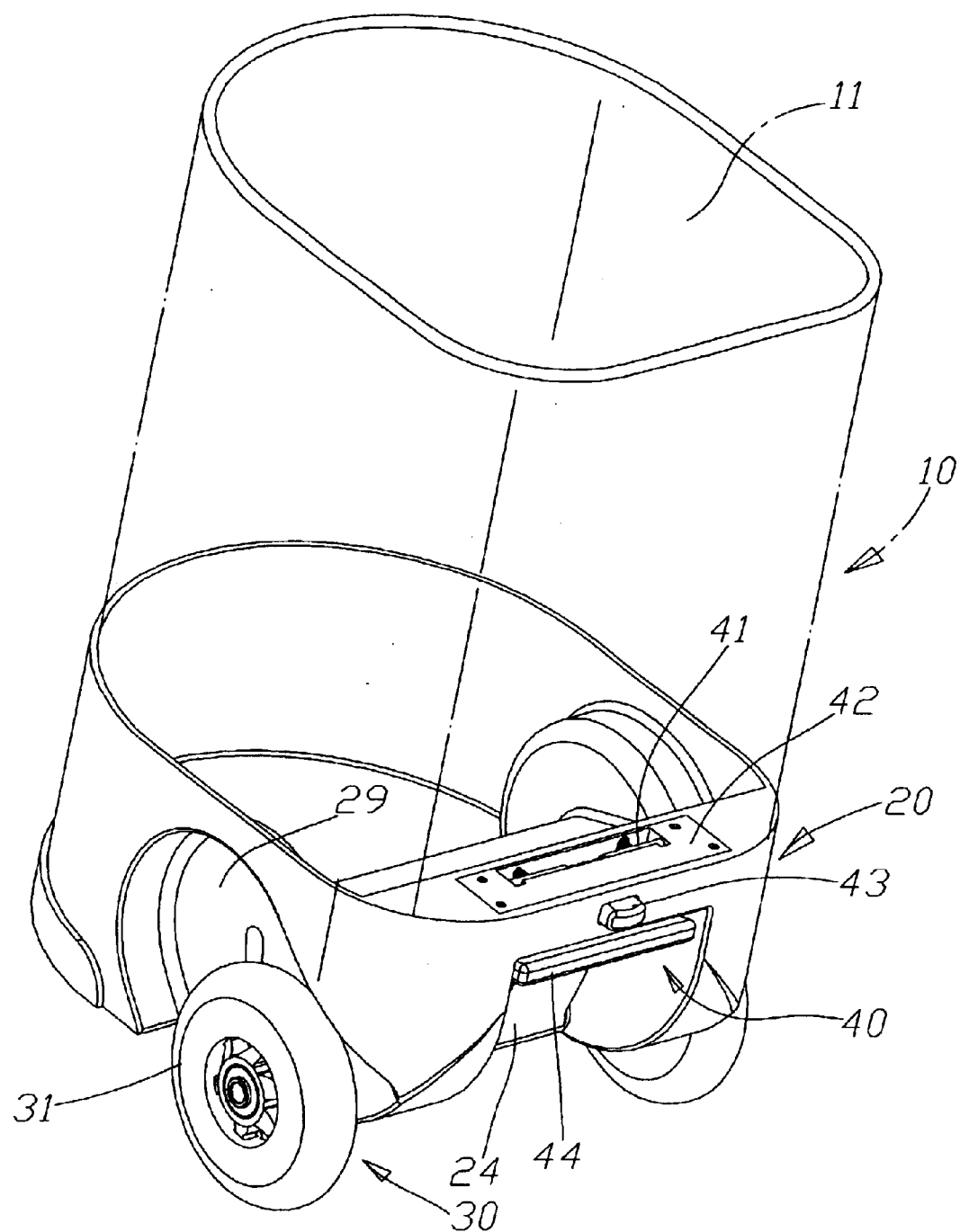
FIG. 3 is a schematic illustration of three-dimensional view of the embodiment of the present invention.

Referring to FIG. 2 and FIG. 3 is an apparatus of golf bag comparing a body 10, a seat 20, a glide-device 30 and a brake-device. The body 10 has a spatial base 11 to place golf clubs. The seat 20 is fastened on body 10. The seat 20 has a base 21. The base 21 includes a slot 22, a plate-channel 23 and a cavity 24 on the top of the seat 20, front of the seat 20 and bottom of the seat 20, respectively. The slot 22 has a spring-holder 25, a screw-hole 26, and a pass-channel 27. The plate-channel 23 connects to the slot 22. The cavity 24 connects to pass-channel 27 which has a notch in both side of said pass-channel. The seat 20 has ditches 29 on two sides. The ditch with an arc shape channel 291 extends to cavity 24. The glide device 30 having at least two wheels 31 with bearing 32 on both said ditches 29 on two side of the seat 20, respectively, and a shaft 33 through the wheels 31 is placed on arc shape channel 291 for the seat 20 gliding; and the brake-device 40 having a jammed-plate 41, a cover 42, back-plate 43 and a start-plate 44 for controlling the seat 20 brake and start. The jammed-plate 41 has a latch 411 and an arm 412 on two sides. The latch 411 is fastening on two sides of pass-channel 27 for connecting the jammed-plate on pass-channel 27. The arm 412 is stretch to cavity 24 which has a jammed-notch 413 along the bottom end formed an arc shaped. The jammed-plate 41 has a linking-notch 414 above, and the linking-notch 414 further has a hole 415 for back-plate 43 fastens. The cover 42 has a screw-hole that is screwed by screw 422 of slot 22 for fastening the cover 42 on slot 22 and sealing the jammed-plate 41. Further, the cover 42 has an extended-channel 423 and a through-channel 424 on top end and front end, respectively. The jammed-plate 41 can be extending on extended-channel 423, so the jammed-plate 41 is extending on extended-channel 423. The jammed-plate 41 with a spring-holder 25 hold a spring 426 which is attached by a holder 425 on said slot 22, the back-plate 43 is placed on said plate-channel 23 of the seat 20 to connected jammed-plate 41. There are rods 431 on two sides of back-plate 43 to through the through-channel 424 of the cover 42, so the hole 415 of jammed-plate 41 can be stuck on rods 431. The starting-plate 44 has an axle 441, joint-plate 442, and a pull-plate 443. The axle 441 has a pivot-hole 444 to connect to pivot 445 of notch 28 on cavity 24. The joint-plate 442 has an axle-hole 446 for shaft 33 pass, so as to link and move the wheels 31. The joint-plate 442 also has a position-hole 447 with a position-rod 448, as shows in FIG. 4. The position-rod 448 has a spring 449 to hook tie-rod 450 on another side of seat 20. The pull-plate 443 has a brake-rod 452 to stick on said arm 412 which is passed to a brake-channel 451 on said pull-plate 443 hook the said jammed-notch 413 for braking seat 20.

Figure 4:
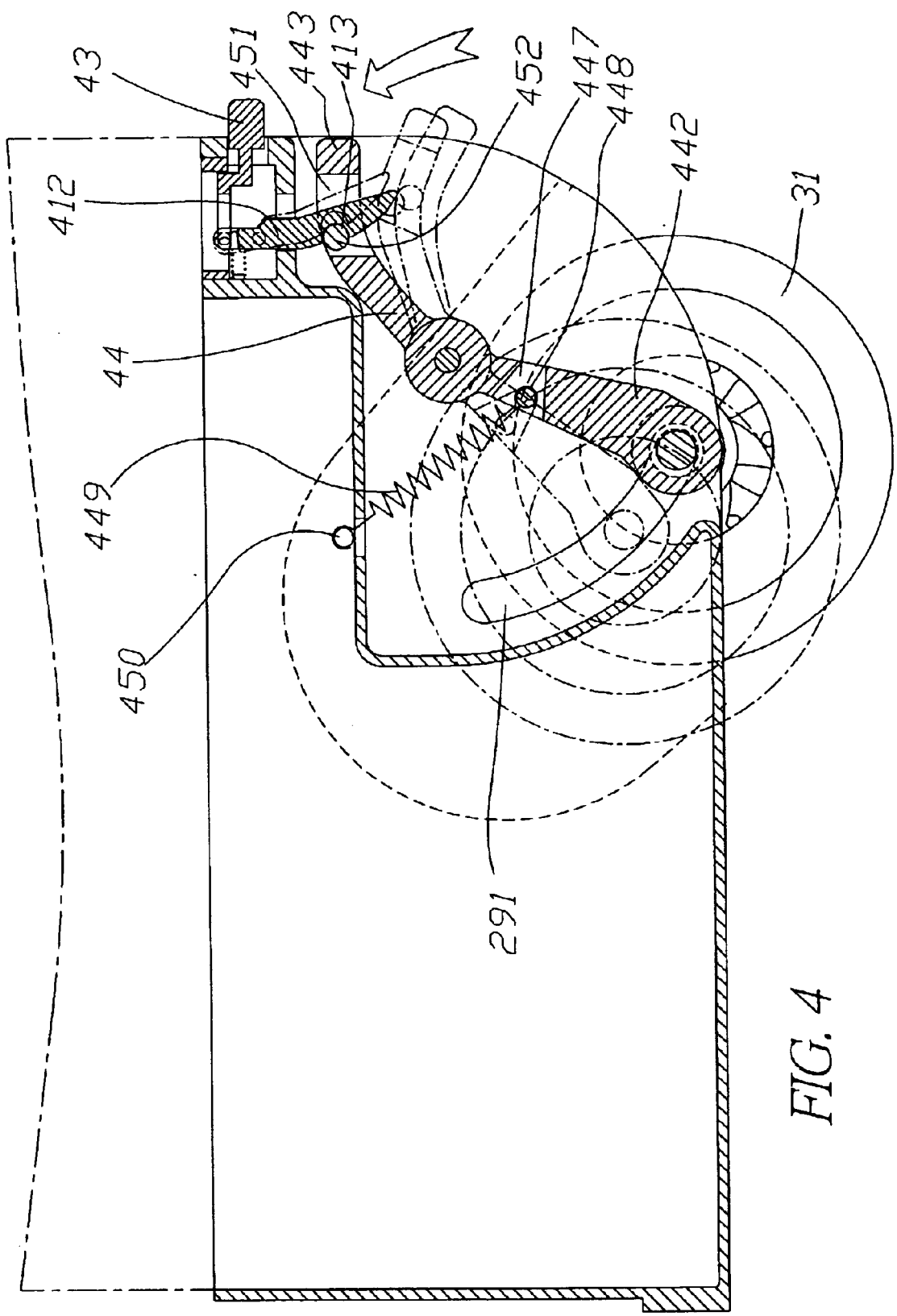
FIG. 4 is a schematic illustration the wheels laid down for towing in accordance with one embodiment of the present invention.
Figures 5, 6:
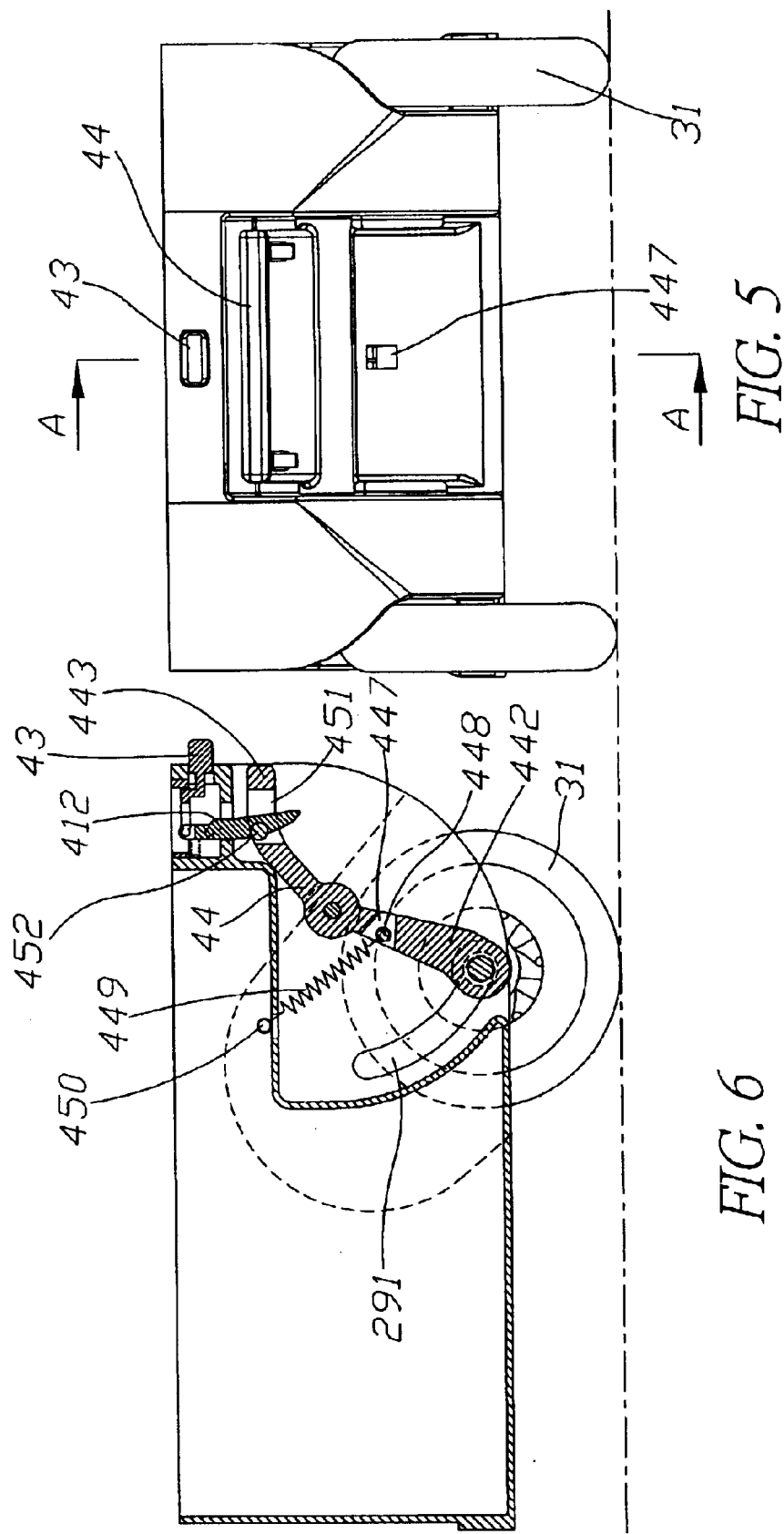
FIG. 5 is illustration of front view of the wheels laid down for towing in accordance with one embodiment of the present invention.
FIG. 6 is illustration of cross-section view along A—A cross-line in accordance with FIG. 5.

Referring to FIGS. 4 and 5 and 6 shows the apparatus of golf bag of the present invention is dragging so the pull-plate 443 of start-plate 44 is set upward and the brake-rod 452 fall to jammed-notch 413 along bottom of the arm 412 in optimal place at the same time, then the wheels 31 is moving by joint-plate 442 along the arc shape channel 291, so as the golf bag can be dragging. When the apparatus of golf bag of present invention is on dragging status the spring 449 is stretch.

Figure 7:
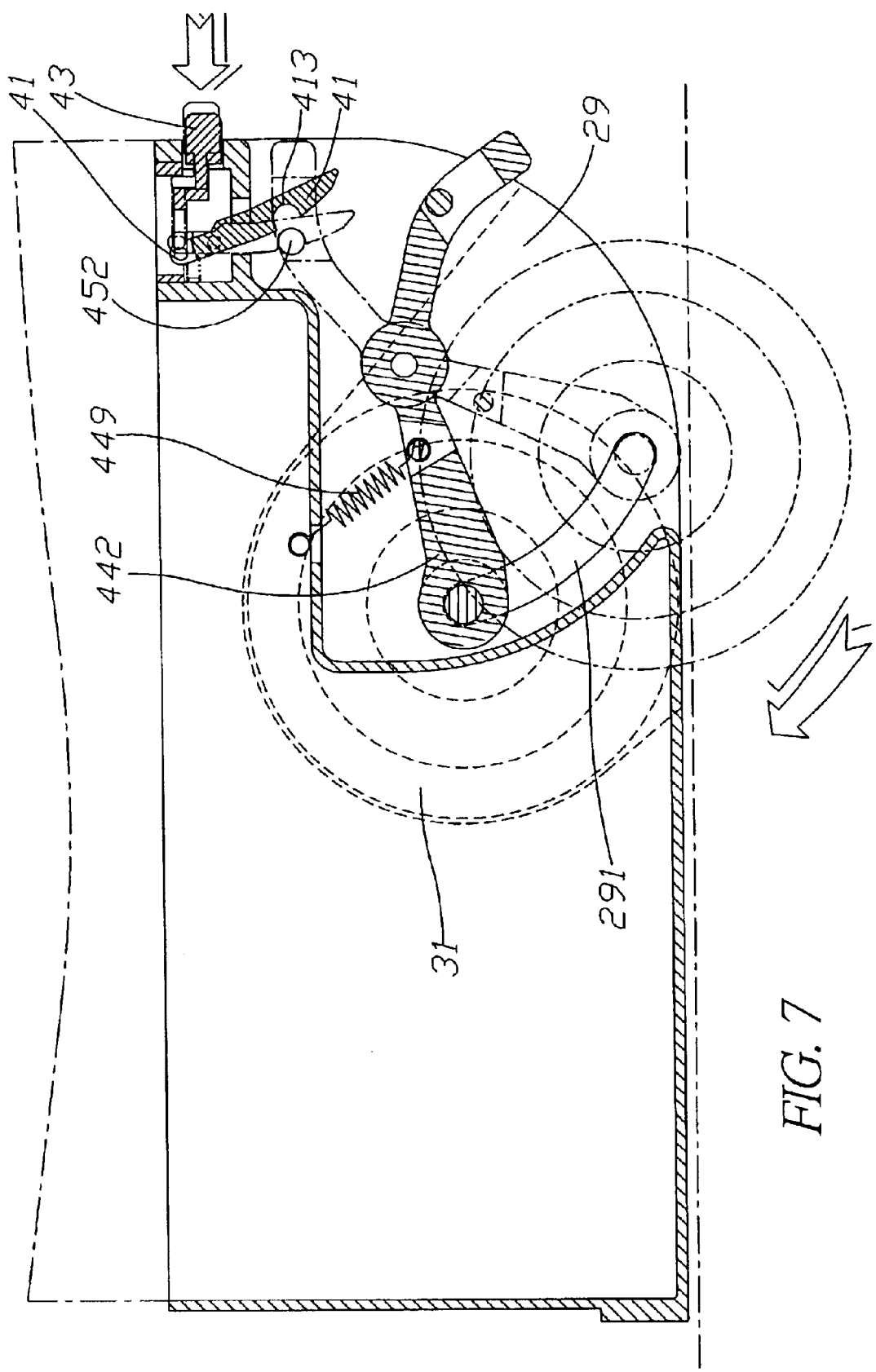
FIG. 7 is a schematic illustration the wheels return for store in accordance with one embodiment of the present invention.

Referring to FIG. 7 shows the wheels 31 is for store. Pressing the back-plate 43, then the back-plate 43 push top of jammed-plate 41 for jammed-plate rotated and brake-rod 452 of start-plate 44 escaped from jammed-notch 413 of arm 412 fastened. The spring 449 pull the joined-plate 442 so the wheels 31 return to ditches 29 along the arc shape channel 291 for hiding the wheels, then the apparatus of golf bag of present invention can be carried on shoulder or back of golf players.

Additionally, the present invention is used the pull-plate to pull on and back-plate to push off to achieve the wheels for tow or store in different situation.

Although specific embodiments have been illustrated and described, it will be obvious to those skilled in the art that various modifications may be made without departing from what is intended to be limited solely by the appended claims.

What is claimed is:

1. A golf bag comprising:
   a body having a space for placing a plurality of golf clubs;
   a seat connected to the body and having a base on said seat having a slot between a plate channel and a cavity and having a plurality of ditches on two sides of said seat which have a shaft to connect said cavity;
   a glide device having at least two wheels on said ditches and the wheels being placed on said shaft for the seat in position; and
   a brake-device having a jammed-plate, a back-plate and a start-plate for controlling the seat when being towed or stored;
   wherein said jammed-plate has a jammed-notch and an arm thereon and is attached to said slot and a first elasticity-component is positioned between said jammed-plate and said slot, the back-plate is placed on said plate-channel to connect said jammed-plate on said seat; and a starting-plate having a joint-plate and a pull-plate, wherein said joint-plate linking said wheels is connected to said seat and a second elasticity-component therein, the pull-plate has a brake-rod extending on said arm which is hooked by said jammed notch of said jammed-plate.

2. The golf bag according to claim 1, wherein said slot further comprises a pass-channel for said jammed-plate to stick in a position.

3. The golf bag according to claim 1, wherein said first elasticity-component is a spring.

4. The golf bag according to claim 1, wherein said slot further comprises a cover to seal the jammed-plate.

5. The golf bag according to claim 1, wherein said shaft has a shaft-channel being arc shaped.

6. The golf bag according to claim 1, wherein said jammed-plate further comprises a linking-notch for back-plate to link.

7. The golf bag according to claim 4, wherein said cover further comprises an extended-channel above for jammed-plate to extend.

8. The golf bag according to claim 7, wherein said extended-channel further comprises a support-notch to position the first elasticity-component.

9. The golf bag according to claim 1, wherein said joint-plate further comprises a fixed-hole and a fixed-rod to connect the second elasticity-component.

10. The golf bag according to claim 1, wherein said pull-plate further comprises a brake-channel for said arm to link said brake-rod.

11. A golf bag comprising:
    a body having a space for placing a plurality of golf clubs;
    a seat connected to the body;
    a wheel-channel being on two side of said seat;
    a plurality of wheels being respectively placed on opposing sides of said wheel-channel;
    a plurality of ditches;
    a shaft connecting said wheels, said shaft passing through the seat and crossing the wheel-channel of said seat, said shaft being slideable along the wheel-channel to position said wheels; and,
    a brake-device having a starting-plate pivotally coupled to said seat, said starting-plate having an axle hole through which said shaft passes to thereby displace said wheels in correspondence with displacement of said starting-plate, said brake-device having a jammed-plate engaged with said starting plate to secure said wheels in an operable position and releasable therefrom for displacement of said starting-plate to position said wheel in a storage position.

12. The apparatus of golf bag according to claim 11, wherein said wheel-channel is arc shaped.

* * * * *